United States Patent [19]
Fujimoto et al.

[11] Patent Number: 5,626,953
[45] Date of Patent: May 6, 1997

[54] FIBER-REINFORCED ELASTIC BODY AND POWER TRANSMISSION BELT USING THE SAME

[75] Inventors: Hiroshi Fujimoto; Kimichika Ohno, both of Kobe, Japan

[73] Assignee: Bando Chemical Industries, Ltd., Kobe, Japan

[21] Appl. No.: 451,547

[22] Filed: May 26, 1995

[30] Foreign Application Priority Data

May 31, 1994 [JP] Japan .................................. 6-118739

[51] Int. Cl.$^6$ ........................................... B32B 27/00
[52] U.S. Cl. ........................... 428/296.4; 428/300.7; 428/383
[58] Field of Search ....................... 428/380, 383, 428/290, 295

[56]      References Cited

FOREIGN PATENT DOCUMENTS

| 0353473 | 2/1990 | European Pat. Off. . |
| 60-146084 | 8/1985 | Japan . |
| 61-127739 | 1/1986 | Japan . |
| 61-127738 | 6/1986 | Japan . |
| 3167372 | 7/1991 | Japan . |
| 4211748 | 3/1992 | Japan . |
| 5125200 | 5/1993 | Japan . |

*Primary Examiner*—Christopher Raimund
*Attorney, Agent, or Firm*—Sixbey, Friedman, Leedom & Ferguson, P.C.; Gerald J. Ferguson, Jr.

[57]      ABSTRACT

In a V-ribbed belt, cords made of polyester fibers are embedded into an adhesion rubber layer made of chlorosulfonated polyethylene rubber whose polymer ingredient is so compounded that the content of chlorine is 15 to 35 wt. % and the content of sulfur is 0.5 to 2.5 wt. %, thereby reinforcing the adhesion rubber layer. The cords are treated with two kinds of adhesives. A first adhesive for first treatment is an adhesive having at least one of an isocynate compound and an epoxy compound. A second adhesive for second treatment is an adhesive formed of a mixture having at least resorcineformaldehyde resin and 2,3-dichlorobutadiefie-contained polymer. A surfactant is added to the second adhesive so that the cords and the adhesion rubber layer are Securely adhered, thereby enhancing dynamic adhesive strength of the V-ribbed belt.

6 Claims, 5 Drawing Sheets

FIBER-REINFORCED ELASTIC BODY AND POWER TRANSMISSION BELT USING THE SAME

BACKGROUND OF THE INVENTION

This invention relates to improvements of fiber-reinforced elastic body and a power transmission belt using the same, and in detail relates to measures for extending the running life of the power transmission belt such as a V-ribbed belt and a V-belt under high-temperature atmosphere.

Recently, as the demand on energy conservation, compaction and the like increases, temperature has been increased around an automotive engine room as compared with around a conventional one. Accompanying this, temperature in a use environment of a power transmission belt has been also increased. Conventionally, as material for power transmission belt, there has been mainly used natural rubber, styrene-butadiene rubber, chloroprene rubber or the like. However, power transmission belts using these rubbers generate cracks at their hardened compression rubber layers at an early stage under high-temperature atmosphere.

To eliminate such a phenomenon of early-stage breakage of the power transmission belt, improvements in heat resistance of the chloroprene rubber have been considered so that certain effects have been brought. However, as far as the chloroprene rubber is used, the improvements in heat resistance are limited and sufficient effects have not yet been provided at the present time.

Then, it has been considered to use chlorosulfonated polyethylene rubber having excellent heat resistance as material for power transmission belt. Though the power transmission belt made of chlorosulfonated polyethylene rubber provides largely extended running life and excellent heat resistance under high-temperature atmosphere as compared with the power transmission belt made of chloroprene rubber, it is very inferior in running life under low-temperature atmosphere of less than $-30°$ C. The reason for this is assumed as follows. That is, since the conventional chlorosulfonated polyethylene rubber is formed by chlorosulfonating linear high density polyethylene whose content of chlorine is 35 wt. %, cohesion of chlorine becomes significant thereby causing hardening of rubber in the low-temperature range. This reduces the rubber in elasticity, resulting sin easy-to-break rubber.

To solve the above problem, there is proposed a power transmission belt, in which a linear low density polyethylene rubber composition, chlorosulfonated so as to have the content of chlorine within the range of 15 to 35 wt. % and the content of sulfur within the range of 0.5 to 2.5 wt. %, is used for a compression rubber layer repeatedly subjected to compressive deformation on the belt run and a chloroprene rubber composition or a hydrogenated nitrile rubber composition is used for an adhesion rubber layer (See Japanese Patent Application Laid-Open Gazette No. 4-211748).

Meanwhile, there is a conventional power transmission belt in which cords as fibers for reinforcing rubber are embedded into a rubber part such as the adhesion rubber layer forming the belt. In order to adhere the rubber part to the cords, commonly used is a mixture liquid of a resorcine-formaldehyde initial condensation product and latex (hereinafter, referred to as an RFL liquid).

In this case, the RFL liquid is generally compounded in such a manner that resorcine and formaldehyde are reacted within the initial molecular ratio of 1.0/1.0 to 1.0/3.0 through basic catalyst and then a resorcine-formaldehyde initial condensation product thus reacted and latex are mixed so as to be 10/100 to 30/100 in weight ratio therebetween.

Commonly used as latex is the same type one as the rubber part forming the belt. For example, in the case the rubber part is made of natural rubber or styrene-butadiene copolymer rubber, vinylpyridine-styrene-butadiene terpolymer rubber latex, styrene-butadiene copolymer rubber latex or natural rubber latex is used. In the case the rubber part is made of the chloroprene rubber, chloroprene rubber latex is used. Accordingly, it can be assumed to use chlorosulfonated Polyethylene rubber latex as a latex ingredient for RFL liquid.

However, the inventors have found out that in the conventional methods for compounding an RFL liquid, adhesion cannot be provided between chlorosulfonated polyethylene rubber and fibers.

For example, there is proposed a method for treating fibers with an RFL liquid including NBR (acrylonitrile-butadiene rubber) latex or carboxylated NBR latex, as disclosed in Japanese Patent Application Laid-Open Gazette No 61-127738. In this method, however, since the rubber type is different between the latex and the rubber part, secure adhesion cannot be provided between the rubber part and the fibers.

Further, Japanese Patent Application Laid-Open Gazette No. 5-125200 discloses a method for treating fibers with an RFL liquid having 2,3-dichlorobutadiene-contained polymer (hereinafter, referred to as 2,3-DCB-contained polymer). In this method, polyester fibers are first treated with a treatment liquid (first adhesive) having an isocyanate compound and/or an epoxy compound and then treated with resorcine-formaldehyde latex (second adhesive) having resorcine-formaldehyde resin and 2,3-DCB-contained polymer latex. Thus, polyester fibers are securely adhered to chlorosulfonated polyolefine through vulcanization.

The above method for subjecting polyester fibers to adhesive treatment provides an enhanced static adhesive strength. However, the adhesive strength between the rubber part and the fibers is unstable in the case of power transmission belts subjected to dynamic stimuli thereby readily inviting troubles. It is assumed as the main reason that because 2,3-DCB-contained polymer is very hard, impregnation property of the polymer between filaments of the fibers is unstable.

In view of the foregoing problems, this invention has been made. An object of this invention is to obtain a fiber-reinforced elastic body in which polyester fibers and chlorosulfonated polyolefine are securely adhered therebetween and particularly to obtain an excellent dynamic adhesive strength in a power transmission belt formed of the above fiber-reinforced elastic body.

SUMMARY OF THE INVENTION

To attain the above object, as shown in claim 1, this invention is targeted for a fiber-reinforced elastic body composed of chlorosulfonated polyolefine reinforced by polyester fibers which is first treated with a first adhesive having at least one of an isocyanate compound and an epoxy compound and is then treated with a second adhesive formed of a mixture including at least resorcine-formaldehyde resin and 2,3-DCB-contained polymer, wherein the rubber polymer ingredient of the fiber-reinforced elastic body is so compounded that the content of chlorine is 15 to 35 wt. % and the content of sulfur is 0.5 to 2.5 wt. %. Further, this invention has the following features.

A feature of the invention according to claim 1 is that a wetting agent is added to the second adhesive.

A feature of the invention according to claim 2 is that the polyester fibers of claim 1 are embedded in the form of cord into the chlorosulfonated polyolefine.

A feature of the invention according to claim 3 is that the chlorosulfonated polyolefine of claim 1 is linear low density polyethylene.

A feature of the invention according to claim 4 is that the wetting agent of claim 1 is a surfactant.

A feature of the invention according to claim 5 is that the concentration of the wetting agent of claim 1 is set to 0.08 to 0.35 parts by weight with respect; to 100 parts by weight of total water content in the second adhesive.

Further, this invention is also targeted for a power transmission belt using the above-mentioned fiber-reinforced elastic body.

More specifically, in the invention according to claim 6, a power transmission belt is so composed that at least a portion of a rubber part forming the belt is formed by the fiber-reinforced elastic body of any one of claims 1 to 5.

In the invention according to claim 7, a power transmission belt is a V-ribbed belt so composed that an adhesion rubber layer thereof is integrally provided with a plurality of ribs and the adhesion rubber layer is formed by the fiber-reinforced elastic body of any one of claims 1 to 5.

The isocyanate compound forming the first adhesive for use in this invention is not particularly limited. For example, there can be used triphenylmethane triisocyanate, phenylthiophosphoate isocyanate, tolylenediisocyanate or the like. There can be also used a polyatomic alcohol-added isocyanate compound obtained by the reaction of the above kinds of isocyanate with a compound having two or more active hydrogens per molecule, such as trimethylol propane and pentaerythritol. Further, there can be also used an isocyanate compound in which isocyanate groups are blocked by the reaction of the above kinds of isocyanate with phenol such as phenol, m-cresol and resortine, with tertiary alcohol such as tert-butyl alcohol or with secondary amine such as iso-propylamine.

The epoxy compound forming the first adhesive for use in this invention is not particularly limited. For example, the epoxy compound is a polyepoxy compound having two or more epoxy groups per molecule and is normally obtained by the reaction of halohydrine groups with polyatomic alcohol or polyatomic phenol. There can be used polyepoxy compounds such as 1,4-diphenylmethane glycidylether obtained by the reaction of epichlorohydrine and bis phenol, and polyethyleneglycol glycidylether obtained by the reaction of epichlorohydrine and polyethylene glycol.

A solvent used to form the first adhesives having the above isocyanate compounds and/or epoxy compounds is not particularly limited. For example, there can be used aromatic hydrocarbon such as benzene and toluene, aliphatic ketone such as acetone and methyl ethyl ketone, ester such as ethyl acetate, and hydrocarbon halide such as methylene chloride. The isocyanate compound in which isocyanate groups are blocked or the epoxy compound can be used as latex. To each of the above first adhesives, there can be added, as needed, one or more selected from natural rubber, chloroprene rubber, styrene-butadiene rubber, acrylonitrile-butadiene rubber, chlorinated polyethylene rubber, chlorosulfonated polyethylene rubber, epichlorohydrine rubber, natural rubber latex, chloroprene rubber latex, styrene-butadiene rubber latex, acrylonitrile-butadiene rubber latex and styrene-butadiene-vinylpyridine terpolymer latex.

The second adhesive for use in this invention is resorcine-formaldehyde rubber latex (RFL liquid). The RFL liquid is an aqueous solution so obtained that resorcine resin and formaldehyde are added to an aqueous solution of caustic soda and are reacted therein and then latex is added thereto.

The mole ratio of resorcine, hereinafter abbreviated as R) and formaldehyde (hereinafter abbreviated as F) is within the range of 1/0.1 to 1/5, and preferably within the range of 1/0.1 to 1/3, thereby obtaining large adhesive strength. When the solid part ratio (weight ratio) of latex to the sum of R and F is within the range of 1/100 to 1/1 and an amount of the solid part of latex to the RFL liquid is within the range of 1 to 50 wt. %, and preferably within the range of 1 to 40 wt. %, large adhesive strength can be obtained. Further, when the concentration of the solid part to the RFL liquid is within the range of 2 to 50 wt. %, and preferably within the range of 3 to 30 wt. %, large adhesive strength can be obtained. In this invention, it is particularly important that 2,3-DCB-contained polymer latex is used as latex and that an elastic complex having satisfactory adhesive strength can be obtained even if there is used polyester fibers treated with an RFL liquid whose concentration of solid part is 10 wt. % or less.

The 2,3-DCB-contained polymer latex is latex of polymer having 2,3-dichloro-1,3-butadiene as a monomer unit and can be obtained by well-known emulsion polymerization.

The chlorosulfonated polyolefine serving as a matrix of the fiber-reinforced elastic body of this invention is a general term for rubber elastic bodies obtained by chlorinating and chlorosulfonating polyolefine. For example, according to the difference in kind of polyolefine as raw materials used in chlorosulfonation reaction, there can be named as a rubber elastic body chlorosulfonated polyethylene, chlorosulfonated ethylene-propylene copolymer, chlorosulfonated ethylene-butene copolymer, chlorosulfonated ethyene-hexene copolymer, chlorosulfonated ethylene-vinyl acetate copolymer and the like. The rubber elastic body is preferably made of linear low density polyethylene rubber (hereinafter referred to as ACSM).

As mentioned above, the polymer ingredient of the chlorosulfonated polyolefine is so set that the content of chlorine is within the range of 15 to 35 wt. %. The reason for this is that oil resistance and mechanical strength cannot sufficiently be obtained in the case of less than 15 wt. % and that resistance again heat and cold cannot sufficiently be obtained in the case of more than 35 wt. %. Further, the polymer ingredient of the chlorosulfonated polyolefine is also set so that the content of sulfur is within the range of 0.5 to 2.5 wt. %. The reason for this is that adhesion through vulcanization can be smoothly conducted.

The chlorosulfonated polyolefine is generally used by the mixture with rubber compounding ingredients such as a vulcanizing agent, a vulcanization accelerator, a reinforcer, a filler and an antioxidant.

Furthermore, as one of the features of this invention, a suitable amount of wetting agent is added to the second adhesive. For example, there can be used as the wetting agent an anionic surfactant, a cationic surfactant, an ampholytic surfactant, a nonionic surfactant, or a fluorine-contained surfactant. The concentration of the wetting agent is set to the range of 0.08 to 0.35 parts by weight with respect to 100 parts by weight of total water content in the second adhesive. The wetting agent is preferably added to the second adhesive using 2,3-DCB-contained polymer latex after the second adhesive is aged for 0 to 16 days, preferably for 24 to 48 hours.

The reason for the above setting of the concentration of the wetting agent is, as shown in FIG. 2 and the below Table 1, that dynamic adhesive strength when the cords are pulled out is abruptly decreased outside the above range. In Table 1, the concentrations of 0 part by weight, 0.08 parts by weight and 0.5 parts by weight correspond to Comparative example 1, an example of this invention and Comparative example 2, respectively. Details to obtain the data of Table 1 will be described in the below-mentioned embodiment of this invention.

TABLE 1

| Concentration of wetting agent (parts by weight) | 0 | 0.08 | 0.175 | 0.35 | 0.5 |
|---|---|---|---|---|---|
| Dynamic adhesive strength in pulling out cords (times) | 43460 | 151240 | 134520 | 112440 | 7580 |

Then, polyester fibers subjected to adhesive treatment with the above-mentioned first and second adhesives are embedded into chlorosulfonated polyolefine. In detail, the elastic body made of chlorosulfonated polyolefine are brought into intimate contact with polyester fibers subjected to surface treatment and are vulcanized thereby concurrently executing vulcanization of chlorosulfonated polyolefine and adhesion of polyester fibers. Thus, there can be obtained a fiber-reinforced elastic body in which the polyester fibers and chlorosulfonated polyolefine are securely adhered through vulcanization.

FIG. 1 shows an embodiment of a power transmission belt in which at least a portion of a rubber part forming the belt is formed by the above fiber-reinforced elastic body. In this embodiment, polyester fibers serve as cords.

The power transmission belt shown in FIG. 1 is a V-ribbed belt A, in which three ribs 1 are integrally attached to the bottom surface of an adhesive rubber layer 2 and the top surface of the adhesion rubber layer 2 is integrally covered with a top fabric 3. The adhesion rubber layer 2 is formed of the above-mentioned fiber-reinforced elastic body. In detail, a plurality of cords 4 made of polyester fibers subjected to adhesive treatment with the first and second adhesives are embedded into the adhesion rubber layer 2 made of chlorosulfonated polyolefine.

Under the above structure, wettability in the surfaces of polyester fibers is improved by the wetting agent (surfactant) added to the second adhesive used in the second process out of two adhesive treatment processes, so that there can be obtained a fiber-reinforced elastic body in which polyester fibers (cords) and chlorosulfonated polyolefine are securely adhered even after the elastic body is subjected to heat at a set temperature for a set time (for example, at 120° C. for 30 min.). Further, if the above fiber-reinforced elastic body is used for at least a portion (e.g., adhesive rubber layer) of a rubber part forming a power transmission belt (e.g., V-ribbed belt), there can be provided extremely extended running life of the power transmission belt under high-temperature conditions.

DESCRIPTION OF THE PREFERRED EMBODIMENT

Description will be made below about an example of this invention together with comparative examples. However, this invention is not limited to the below-mentioned example.

Respective RFL liquids (second adhesives) of a this invention example and Comparative examples 1 to 4 were prepared in respective compositions shown in Table 2. Polyester fibers of 1000 de/2×3 subjected to preliminary adhesive treatment with an isocyanate compound were second treated with the above RFL liquids and then heat-treated at 245 for 2 minutes. A surfactant as a wetting agent used in the second adhesive treatment is sodium dioctylsulfosuccinate produced under the trade name of Pellex by Kao Corporation.

TABLE 2

|  | This Invention | Comparative examples | | | |
|---|---|---|---|---|---|
|  |  | 1 | 2 | 3 | 4 |
| RFL liquid |  |  |  |  |  |
| RF liquid | 430.5 | 445.1 | 367.1 | 445 | 445 |
| 2,3-DCB (32% solid parts) | 787.4 | 814.2 | 671.5 | — | — |
| CR latex | — | — | — | 520 | — |
| NBR latex | — | — | — | — | 520 |
| Water | 716.4 | 740.8 | 611 | 1035 | 1035 |
| Wetting agent (2%) | 65.8 | — | 630.5 | — | — |

Respective chlorosulfonated polyethylene rubber sheets each having the composition shown in the below-mentioned Table 3 were brought in intimate contact with respective treated cords above-mentioned and then vulcanized at 160 for 30 minutes. The resulting vulcanized rubber sheets were subjected to a peeling-off test for measuring peel strength in peeling off the treated fiber cord from the vulcanized rubber sheet (See FIG. 3), a pulling-out test for measuring strength required to pull the treated cord out of the vulcanized rubber sheet (See FIGS. 4 to 8), and a dynamic pulling-out test for measuring times of dynamic distortion until the treated cord was pulled out after the start of application of dynamic distortion to the vulcanized rubbers sheet. Respective details of the above tests are described below and test results are shown in Table 4.

<Details of cord peeling-off test>

Figure 1:
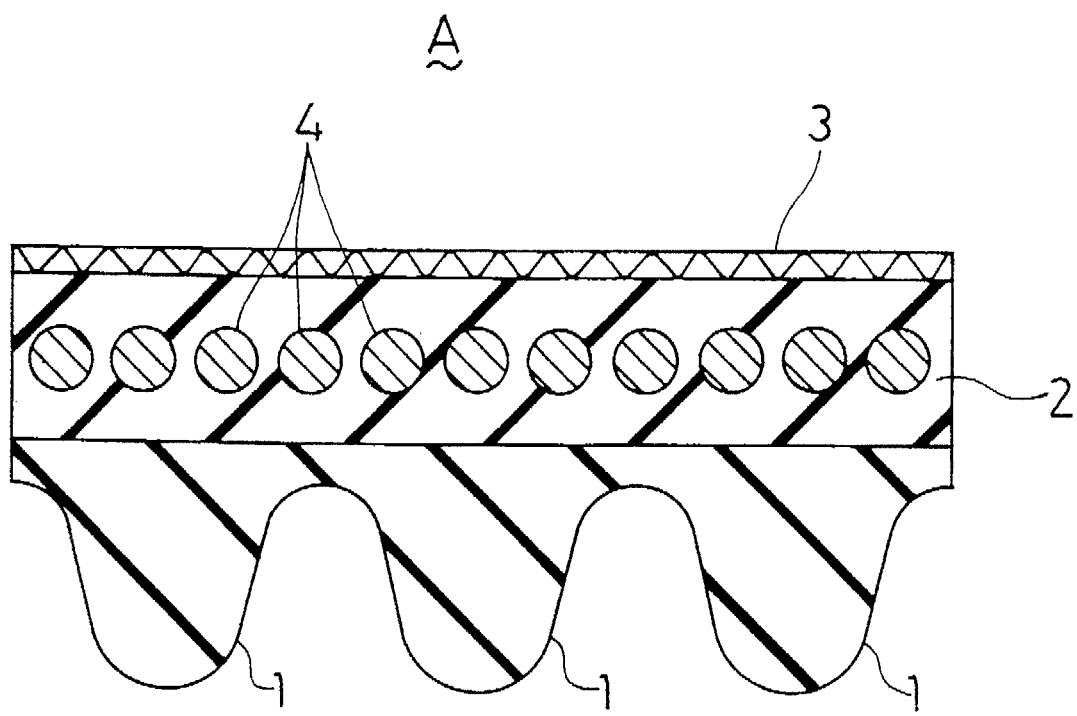
FIG. 1 is a cross-sectional view of & V-ribbed belt of this invention.
Figure 2:
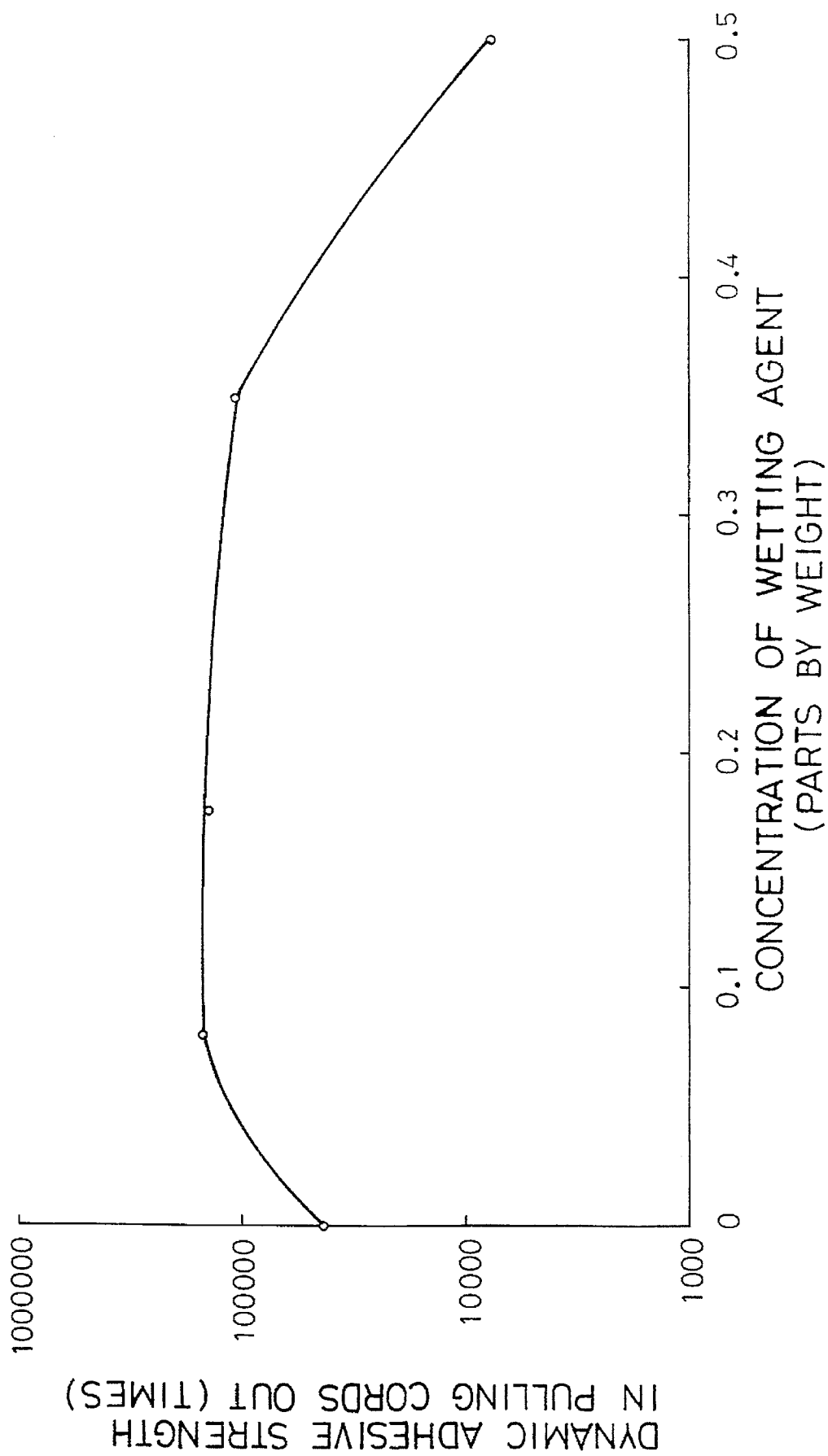
FIG. 2 shows graphically expressed data on the relationship between the concentration of a wetting agent and dynamic adhesive strength in pulling out cords.
Figure 3:
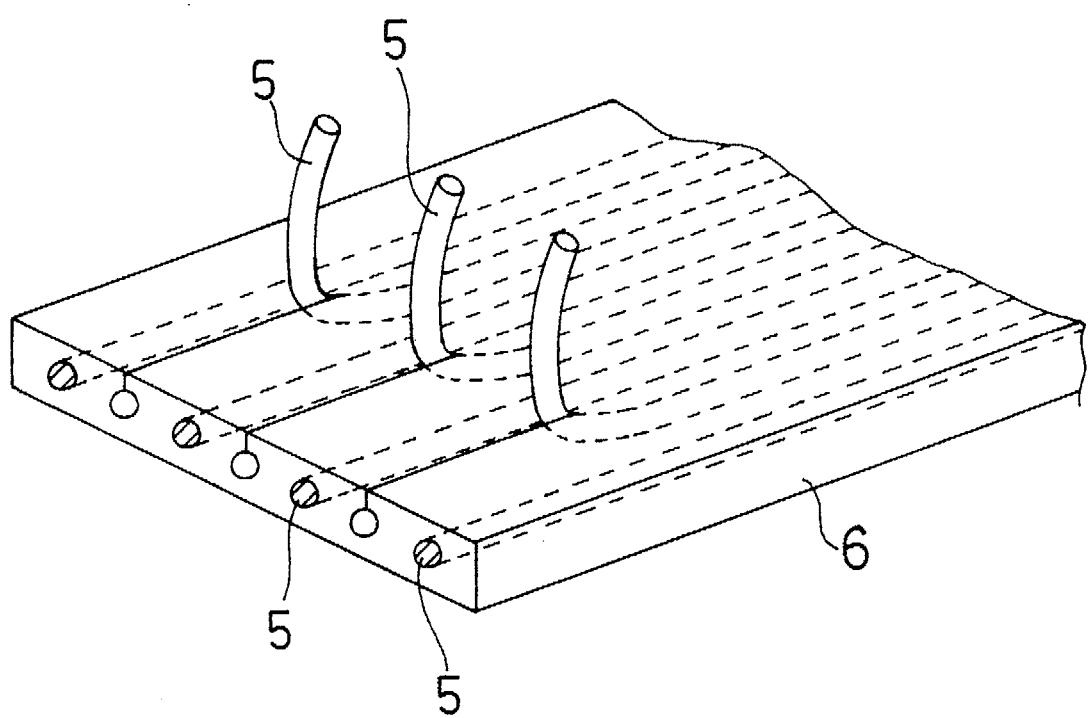
FIG. 3 is an explanatory diagram showing details of a cord peeling-off test.

As shown in FIG. 3, there is prepared a sample in which seven treated fiber cords 5 are embedded into a vulcanized rubber sheet 6. Three treated fiber cords 5 selected at intervals of one cord are caught between upper and lower chucks and then concurrently peeled off under the peeling condition of a 40 mm inter-chuck distance, a 100 mm/min peeling speed and an 80 mm peeling distance. Each value of adhesive strength in peeling off the cords 5 shown in Table 4 is a mean value of the sum of respective peak values measured to three treated fiber cords.

<Details of cord pulling-out test>

Figure 5:
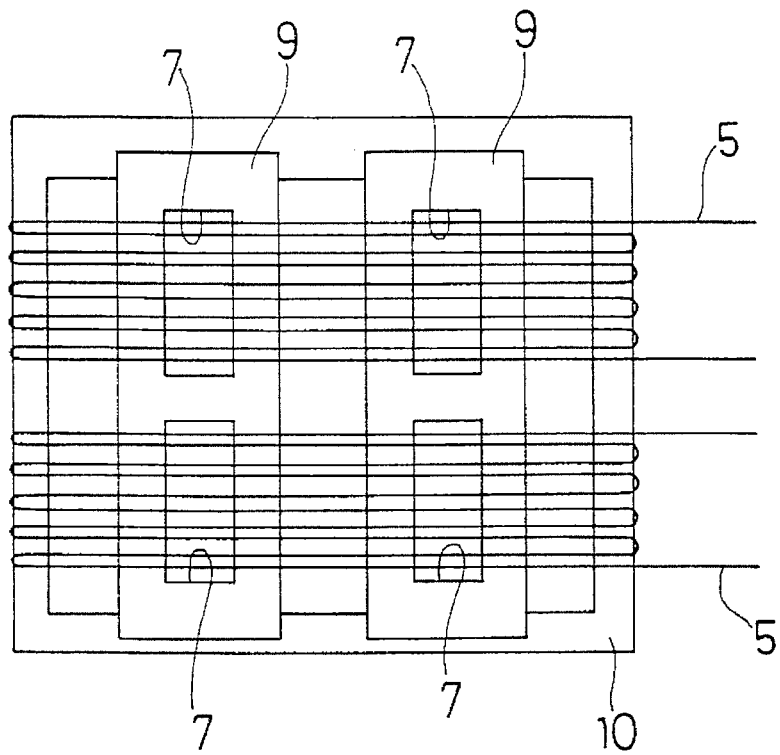
FIG. 5 is a plan view showing the state that the die of FIG. 4 is set on a die frame and treated fiber cords are wound around the die and die frame.
Figure 4:
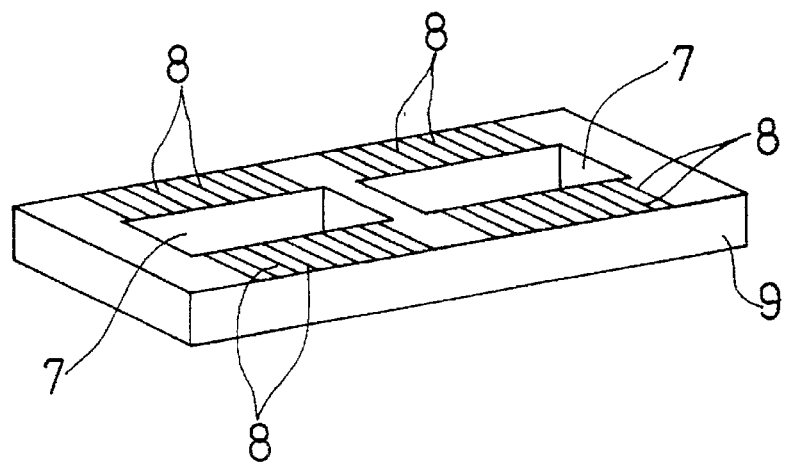
FIG. 4 is a perspective view of a die for producing test pieces used in a cord pulling-out test.
Figure 6:
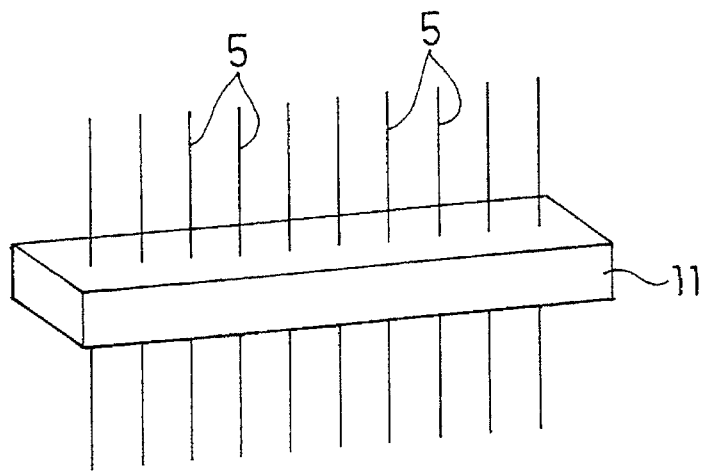
FIG. 6 is a perspective view of a test piece in the state that the treated fiber cords project from both sides of the test piece.
Figure 7:
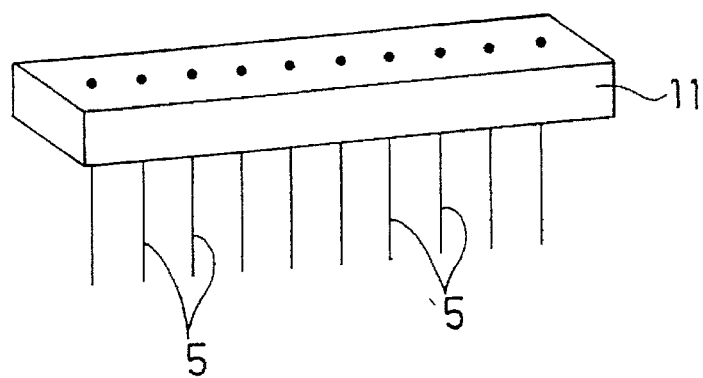
FIG. 7 is a perspective view of the test piece in the state that the treated fiber cords are cut off at one side of the test piece.
Figure 8:
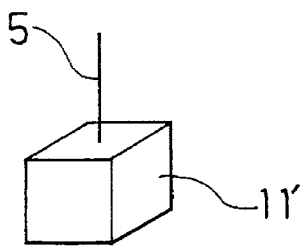
FIG. 8 is a perspective view of a test piece used in the cord pulling-out test.

First, as shown in FIG. 4, there is first prepared four dies 9 in each of which two rectangle grooves 7 for forming samples are formed and a plurality of thin slots 8 for setting cords are formed on the both sides of each rectangle groove 7. Unvulcanized rubber is inserted to the rectangle grooves 7 of each die 9. As shown in FIG. 5, with a first pair of the above dies 9 set on a rectangle die frame 10 in such a manner that the thin slots 8 are directed upward, long treated fiber cords 5 are wound around the die frame 10. Next, the remaining second pair of dies 9 are set on the die frame 10 so as to be stacked on the first pair of dies 9 in such a manner that the thin slots 8 of the second pair of dies 9 are directed downward. In this state, the unvulcanized rubber inserted to the rectangle grooves 7 of the dies 9 is vulcanized. Then, the dies 9 are removed from the die frame 10 so that there are obtained two rectangular prism-like test pieces 11 with dimensions of 11 cm×2 cm×1 cm into which a plurality of treated fiber cords 5 are embedded so as to pass through. Thereafter, as shown in FIG. 7, the treated fiber cords 5 are cut off at the parts projecting from one side of each test piece 11 and are cut to a projecting length of 7 cm at the parts projecting from another side of the test piece 11. Next, as shown in FIG. 8, the test pierce 11 is cut into small dice-shaped test pieces 11' of 10 mm square from each of which a single treated fiber cord 5 projects. The test piece 11' thus obtained is set to a jig (no-shown) for pulling out the cord, and the treated fiber cord 5 is caught by a chuck of the jig and is pulled by it at a pulling speed of 50 mm/min, thereby obtaining a tension when the treated fiber cord 5 is pulled out.

<Details of dynamic pulling-out test>

The test piece 11' of the same type as used in the above cord pulling-out test is caught by upper and lower chucks (no-shown) and vibration is applied to the test piece 11' under the condition of a 10 kg initial load, a ±7 kg vibration load and 10 Hz frequency, thereby obtaining measured vibration times at the time the treated fiber cord 5 is pulled out of the test piece 11'.

TABLE 3

|  | This invention example | Comp. examples | | | |
| --- | --- | --- | --- | --- | --- |
|  |  | 1 | 2 | 3 | 4 |
| ACSM | 100 | 100 | 100 | — | — |
| CR | — | — | — | 100 | — |
| H-NBR | — | — | — | — | 100 |
| Carbon black N-550 | 40 | 40 | 40 | 25 | 25 |
| Antioxidant | 2 | 2 | 2 | 2 | 2 |
| Vulcanization Accelerator | 2 | 2 | 2 | 2.25 | 4 |
| MgO, $Al_2O_3$ Solid solution | 8 | 8 | 8 | — | — |
| N-N'-m-phenylenedimaleimide | 1 | 1 | 1 | — | — |
| MgO | — | — | — | 4 | — |
| Hydrated silicate | — | — | — | 20 | — |
| Sulfur | — | — | — | 1 | 1 |

(unit: parts by weight)

TABLE 4

|  | Unit | This inv. | Comp. examples | | | |
| --- | --- | --- | --- | --- | --- | --- |
|  |  |  | 1 | 2 | 3 | 4 |
| Adhesive Strength in peeling off |  |  |  |  |  |  |
| Original | kgf/3 cords | 16.6 | 9.91 | 9.6 | 14 | 16 |
| Subjected to heat* | kgf/3 cords | 4.4 | 2.75 | 3.42 | 3 | 4 |
| Adhesive Strength in pulling out |  |  |  |  |  |  |
| Original | kgf/cm | 34.8 | 32.1 | 36.6 | 33 | 33 |
| Subjected to heat* | kgf/cm | 17.8 | 8.75 | 13.8 | 10 | 15 |
| Dynamic adhesive strength |  |  |  |  |  |  |
| Original | times | 151240 | 43460 | 7580 | 10000 | 100000 |

Note
*After subjected to heat at 120° C. for 30 min.

As is evident from data shown in Table 4, the example of this invention has both of enhanced adhesive strength against peeling and enhanced adhesive strength against pulling-out of cords after subjected to heat at 120° C. for 30 min. by adding, to the RFL liquid after aged, 0.08 parts by weight of wetting agent with respect to 100 parts by weight of total water content in the RFL liquid. Further, in the dynamic pulling-out test, the example of this invention is about 15 times as excellent as Comparative example 3 and about 1.5 times as excellent as Comparative example 4. On the contrary, Comparative example 1 in the dynamic pulling-out test exhibits life time extended about five times as long as Comparative example 3 (the case of using CR), even in the case that the wetting agent (surfactant) is not added to the RFL liquid after aged. Since in Comparative example 2, 0.5 parts by weight of wetting agent (surfactant) with respect to 100 parts by weight of total water content in the RFL liquid is added to the RFL liquid after aged, Comparative example 2 has enhanced adhesive strength after subjected to heat at 120° C. for 30 min., as compared with Comparative example 3. However, Comparative example 2 does not exhibit stable dynamic adhesive strength in pulling out the cord as shown in the example of this invention.

As described above, according to this invention, since the wetting agent (surfactant) is added to the second adhesive for use in the second process out of two adhesive treatment processes, wettability in the surface of polyester fibers (cords) can be improved, so that polyester fibers (cords) and the elastic body made of chlorosulfonated polyolefine can be securely adhered even after subjected to heat at 120° C. for 30 minutes. Further, a power transmission belt (V-ribbed belt) which uses the above fiber-reinforced elastic body for at least a portion of a rubber part forming the belt can extremely increase the running life under high-temperature atmosphere.

We claim:

1. A fiber-reinforced elastic body composed of chlorosulfonated polyolefin reinforced by polyester fibers, which fibers are treated with a first adhesive comprising an isocyanate compound or an epoxy compound and are then treated with a second adhesive formed from a mixture comprising resorcinol-formaldehyde resin liquid and a 2,3 dichlorobutadiene polymer, wherein the chlorosulfonated polyolefin has a chlorine content of 15 to 35 wt. % and a sulfur content of 0.5 to 2.5 wt. %, wherein a wetting agent is added to the second adhesive, the concentration of the wetting agent being set to 0.08 to 0.35 parts by weight with respect to 100 parts by weight of total water content in the second adhesive.

2. A fiber-reinforced elastic body according to claim 1, wherein the polyester fibers are embedded in the form of cord into the chlorosulfonated polyolefin.

3. A fiber reinforced elastic body according to claim 1, wherein the chlorosulfonated polyolefin is linear low density polyethylene.

4. A fiber reinforced elastic body according to claim 1, wherein the wetting agent is a surfactant.

5. A power transmission belt comprising the fiber-reinforced elastic body of any one of claims 1 to 4.

6. A power transmission belt comprising an adhesive rubber layer integrally provided with a plurality of ribs, wherein the adhesive rubber layer is formed from the fiber-reinforced elastic body of any one of claims 1 to 4.

* * * * *